United States Patent
Ohno et al.

(10) Patent No.: US 8,136,204 B2
(45) Date of Patent: Mar. 20, 2012

(54) DOOR HINGE FOR VEHICLE, HAVING CHECK FUNCTION

(75) Inventors: Takahiro Ohno, Utsunomiya (JP); Takeshi Ishikawa, Utsunomiya (JP); Hidetoshi Ijuin, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 12/515,166

(22) PCT Filed: Oct. 9, 2007

(86) PCT No.: PCT/JP2007/069671
§ 371 (c)(1),
(2), (4) Date: May 15, 2009

(87) PCT Pub. No.: WO2008/059680
PCT Pub. Date: May 22, 2008

(65) Prior Publication Data
US 2009/0300880 A1     Dec. 10, 2009

(30) Foreign Application Priority Data

Nov. 17, 2006  (JP) .................................. 2006-311529
Apr. 24, 2007  (JP) .................................. 2007-114045

(51) Int. Cl.
*E05D 11/10* (2006.01)
(52) U.S. Cl. ............ 16/344; 16/50; 16/85; 296/146.11
(58) Field of Classification Search .................... 16/345, 16/50, 85, DIG. 10, 334, 344, 332, 250; 296/146.11
See application file for complete search history.

(56) References Cited

U.S. PATENT DOCUMENTS

| 1,612,237 | A | * | 12/1926 | Thornton | 16/50 |
| 3,028,619 | A | * | 4/1962 | Schlage et al. | 16/49 |
| 4,829,633 | A | | 5/1989 | Kassner | |
| 6,457,207 | B1 | * | 10/2002 | Horberg | 16/50 |
| 6,532,627 | B2 | * | 3/2003 | Audisio | 16/334 |
| 6,684,455 | B1 | * | 2/2004 | Mertin | 16/334 |
| 7,103,938 | B2 | * | 9/2006 | Bruckner et al. | 16/334 |
| 2009/0133222 | A1 | * | 5/2009 | Ochiai | 16/347 |
| 2010/0139044 | A1 | * | 6/2010 | Minegishi | 16/333 |

FOREIGN PATENT DOCUMENTS

| DE | 42 12 181 A1 | 10/1993 |
| DE | 202 01 320 U1 | 5/2003 |
| JP | 63-107673 | 5/1988 |
| JP | 2001-049940 | 2/2001 |
| JP | 2002-166725 | 6/2002 |

(Continued)

*Primary Examiner* — William L. Miller
(74) *Attorney, Agent, or Firm* — Rankin, Hill & Clark LLP (57) ABSTRACT

A door hinge for a vehicle, having a check function includes: a vehicle body-side hinge member to be fixed to a vehicle body; a door-side hinge member to be fixed to a door; a hinge shaft that relatively rotatably connects between the vehicle body-side hinge member and the door-side hinge member; a movable member capable of being displaced in a direction substantially along this hinge shaft; an operation conversion device that converts a relative rotational operation between the vehicle body-side hinge member and the door-side hinge member into a displacement of the movable member substantially along the axial direction; and a check resistance application device that applies a retention resistance against an operational force to the movable member.

14 Claims, 10 Drawing Sheets

FOREIGN PATENT DOCUMENTS

| | | |
|---|---|---|
| JP | 2005-042736 | 2/2005 |
| JP | 2005-232959 | 9/2005 |
| JP | 2006-064122 | 3/2006 |
| JP | 2007-145055 | 6/2007 |
| WO | 2008-059680 | 5/2008 |

* cited by examiner

DOOR HINGE FOR VEHICLE, HAVING CHECK FUNCTION

TECHNICAL FIELD

The present invention relates to a door hinge for openably and closably attaching a vehicle door to a vehicle body, in particular, to a door hinge for a vehicle, having a check function, that is provided with a function to maintain the opening degree of the door.

Priority is claimed on Japanese Patent Application No. 2006-311529 and Japanese Patent Application No. 2007-114045, the contents of which are incorporated herein by reference.

BACKGROUND ART

In general, a door of a vehicle is openably and closably attached to a vehicle body via a door hinge, and is configured so that when the door is opened to a set opening degree, a retention resistance is received by a door checker provided between the vehicle body and the door.

However, in such a door attachment structure, there is a need for providing the door checker separately from the door hinge, and therefore the number of components increases. Consequently, there has been developed a door hinge that is provided with a function to retain the door opening degree at a set position (door hinge having a check function).

In a conventional door hinge having a check function, a vehicle body-side hinge member and a door-side hinge member are relatively rotatably connected by a hinge shaft, and there is provided a check resistance application device that increases rotational resistance when both of the hinge members have rotated up to a set angle (for example, refer to Patent Documents 1 and 2).

Specifically, for example, an engagement roller that is spring biased in the radial direction is arranged on the outer circumferential side of the hinge shaft, and an engagement groove is formed in a set angle position on the outer circumferential surface of the hinge shaft. When the vehicle body-side hinge member and the door-side hinge member have rotated up to the set angle, the engagement roller engages with the above engagement groove, to thereby increase rotational resistance.

[Patent Document 1] Japanese Unexamined Patent Application, First Publication No. 2001-49940
[Patent Document 2] Japanese Unexamined Patent Application, First Publication No. 2002-166725

DISCLOSURE OF INVENTION

Problems to be Solved by the Invention

In this conventional door hinge having a check function, a retention resistance is directly applied from the radial direction of the hinge shaft. Therefore, in order to apply a large retention resistance, the outer diameter dimension of the hinge needs to be increased significantly. However, in a hinge to be attached to a vehicle, its outer diameter dimension is restricted due to reasons associated with its installation space. Therefore, it is difficult to ensure a sufficiently large retention resistance.

The present invention has been achieved with consideration of the above circumstances, and an object thereof is to provide a door hinge for a vehicle, having a check function, that is capable of obtaining a large retention resistance without the need to significantly increase the outer diameter dimension thereof.

Means for Solving the Problem

In order to solve the above problems, the present invention employs the following measures.

(1) A door hinge for a vehicle, having a check function according to the present invention comprises: a vehicle body-side hinge member to be fixed to a vehicle body; a door-side hinge member to be fixed to a door; a hinge shaft that relatively rotatably connects between the vehicle body-side hinge member and the door-side hinge member; a movable member capable of being displaced in a direction substantially along this hinge shaft; an operation conversion device that converts a relative rotational operation between the vehicle body-side hinge member and the door-side hinge member into a displacement of the movable member substantially along the axial direction; and a check resistance application device that applies a retention resistance against an operational force to the movable member.

According to the above door hinge for a vehicle, having a check function, when opening or closing the door, the vehicle body-side hinge member and the door-side hinge member relatively rotate about the hinge shaft. The rotational operation at this time is converted by the operation conversion device into a displacement of the movable member substantially along the axial direction. Moreover, at this time, when the check resistance application device applies a retention resistance against the operational force to the movable member, the vehicle body-side hinge member and the door-side hinge member receive this retention resistance and retain the opening degree. The retention resistance applied from the check resistance application device to the movable member is amplified by the operation conversion device, so as to prevent rotation between the vehicle body-side hinge member and the door-side hinge member.

(2) A resistance application section of the check resistance application device may be provided in a plurality of locations on a movement path of the movable member.

In this case, the angle between the vehicle body-side hinge member and the door-side hinge member can be retained at multiple steps of angles.

(3) The check resistance application device may be provided with an elastic member that elastically deforms in a circumferential direction around the hinge shaft, corresponding to an axial direction displacement of the movable member.

In this case, application and release of the check resistance is clearly switched by the elastic deformation of the elastic member.

(4) There may be employed a configuration in which: the elastic member extends along an axial direction of the hinge shaft; and the check resistance application device is provided with the elastic member and a stopper protrusion provided integrally with this elastic member.

In this case, for example, when after the movable member has reached the position of the stopper protrusion, and the door is further operated, a force is applied to the elastic member from the movable member via the stopper protrusion. Then, the elastic member elastically deforms and the movable member rides over the stopper protrusion.

(5) A resistance application section of the check resistance application device may be provided consecutively on a movement path along the axial direction of the movable member.

In this case, the movable member, at any position on the movement path, receives a retention resistance from the resistance application section.

(6) The check resistance application device may be provided with an elastic member that always exerts a biasing force in a pressing direction, on the resistance application section.

In this case, the resistance application section always receives a biasing force from the elastic member, and applies a stable retention resistance to the movable member.

(7) The elastic member may be provided on an entire movement path along an axial direction of the movable member.

In this case, the resistance application section receives a biasing force from the elastic member over the entire movement range of the movable member.

(8) The check resistance application device may be provided symmetrically about a center of the hinge shaft.

In this case, a well balanced retention resistance is uniformly received around the hinge shaft.

(9) The check resistance application device may be provided in a case that covers an entire movement path of the movable member.

In this case, the check resistance application device provided in the case applies a retention resistance to the movable member.

(10) There may be employed a configuration in which: the case is formed in a sectionally square shape; and the check resistance application device is provided in a corner section of the case.

In this case, in the corner section of the case distanced from the center of the hinge shaft, the check resistance application device applies a retention resistance to the movable member.

Effect of the Invention

According to the configuration of the invention described in (1) above, the operation conversion device converts a relative rotational operation between the vehicle body-side hinge member and the door-side hinge member into a displacement of the movable member substantially along the axial direction. Furthermore the check resistance application device applies a retention resistance against the operational force to the movable member. Therefore the retention resistance of the check resistance application device is amplified by the operation conversion device, and a sufficiently large retention resistance can be obtained. Consequently, according to the present invention, it is possible to obtain a sufficiently large retention resistance without having to significantly increase the outer diameter.

In the case of the configuration described in (2) above, the angle between the vehicle body-side hinge member and the door-side hinge member can be retained at multiple steps of angles. Therefore it is possible to increase the marketability of the vehicle. In particular, in the present invention, by increasing the axial direction movable range of the movable member, it is possible to easily achieve multiple steps of the retaining position without having to increase the outer diameter of the hinge.

In the case of the configuration described in (3) above, application and release of retention resistance can be more clearly performed, by the elastic deformation of the elastic member. Therefore it is possible to enhance a detent sensation at the time of a door opening and closing operation.

In the case of the configuration described in (4) above, the check resistance application device has the stopper protrusion provided integrally with the elastic member that extends in the axial direction. Therefore the structure is simplified and a reduction in manufacturing cost can be achieved.

In the case of the configuration described in (5) above, the resistance application device is consecutively provided on the movement path of the movable member along the axial direction, and when the vehicle body-side hinge member and the door-side hinge member are at any relative rotational position, a stable retention resistance is always obtained by the resistance application device. Therefore, it is possible to enhance the marketability of the door opening/closing section.

In the case of the configuration described in (6) above, it is possible, with the elastic member, to always exert a stable biasing force in the pressing direction, on the resistance application section. Therefore it is possible to ensure a stable retention resistance at any door opening degree.

In the case of the configuration described in (7) above, the elastic member is provided on the entire movement path of the movable member substantially along the axial direction. Therefore the biasing force applied from the elastic member to the resistance application section is stable on the entire movement path, and it is possible to ensure an even more stable retention resistance.

In the case of the configuration described in (8) above, the retention resistance applied from the check resistance application device is symmetric about the center of the hinge shaft. Therefore it is possible to obtain an even more stable opening/closing operation of the hinge.

In the case of the configuration described in (9) above, the check resistance application device is provided in the case that covers the periphery of the movable member. Therefore it is possible to reduce manufacturing cost by reducing the number of components.

In the case of the configuration described in (10) above, a retention resistance can be applied by the check resistance application device at the corner section of the case distanced from the center of the hinge shaft. Therefore it is possible to efficiently obtain a large retention resistance without having to increase the size of the entire door hinge.

DESCRIPTION OF REFERENCE SYMBOLS 1, 101, 201 Door hinge
2 Vehicle body-side hinge arm (vehicle body-side hinge member)
3 Door-side hinge arm (door-side hinge member)
4 Hinge shaft
9 Slider (movable member)
13 Guide hole (check resistance application device)
14 Protrusion (operation conversion device)
15 Resistance control plate (check resistance application device)
16 Plate spring (elastic member)
18a, 18b Stopper protrusion (resistance application section)
20 Guide groove
30 Vehicle body-side hinge member
31 Door-side hinge member
32 Hinge shaft
34 Helical guide groove (operation conversion device, resistance application section, and check resistance application device)
35 Linear guide groove (operation conversion device, resistance application section and check resistance application device)
36 Spherical body (movable member)
37 Tie belt (elastic member, and check resistance application device)
40 Vehicle body-side hinge member
41 Door-side hinge member
42 Case
44 Hinge shaft
48 Helical guide groove (check resistance application device)
49 Retention groove (check resistance application device)
50a Retention section (check resistance application device)
51 Spherical body (movable member)
52a, 52b Stopper protrusion (resistance application section)

BEST MODE FOR CARRYING OUT THE INVENTION

Respective embodiments of the present invention are described hereunder, based on the accompanying drawings.

At first, a first embodiment of the present invention is described hereunder, with reference to FIG. 1 to FIG. 5.

Figure 1:
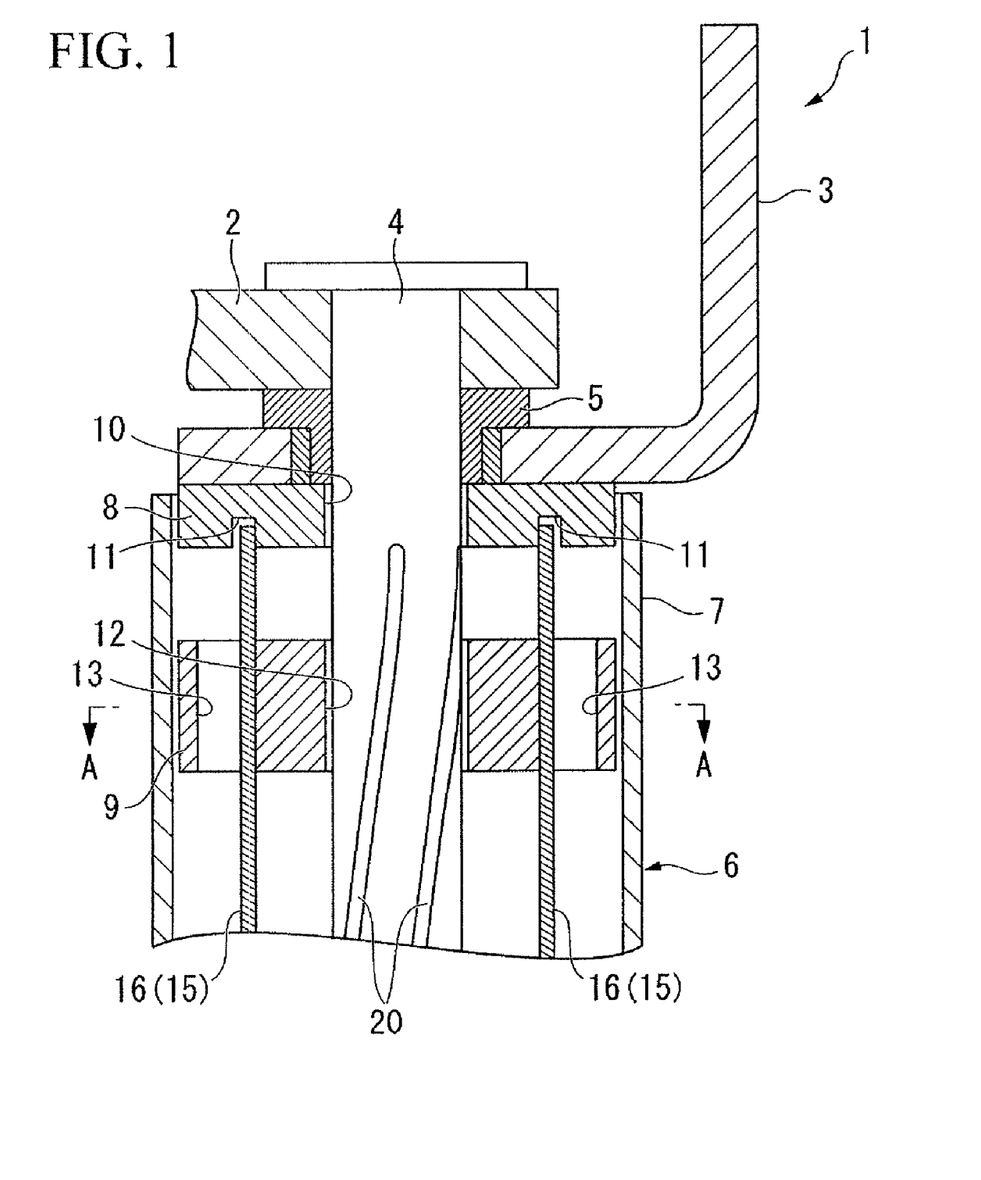
FIG. 1 is a drawing showing a first embodiment of the present invention, being a longitudinal sectional view of an upper half section of a door hinge having a check function.
Figure 2:
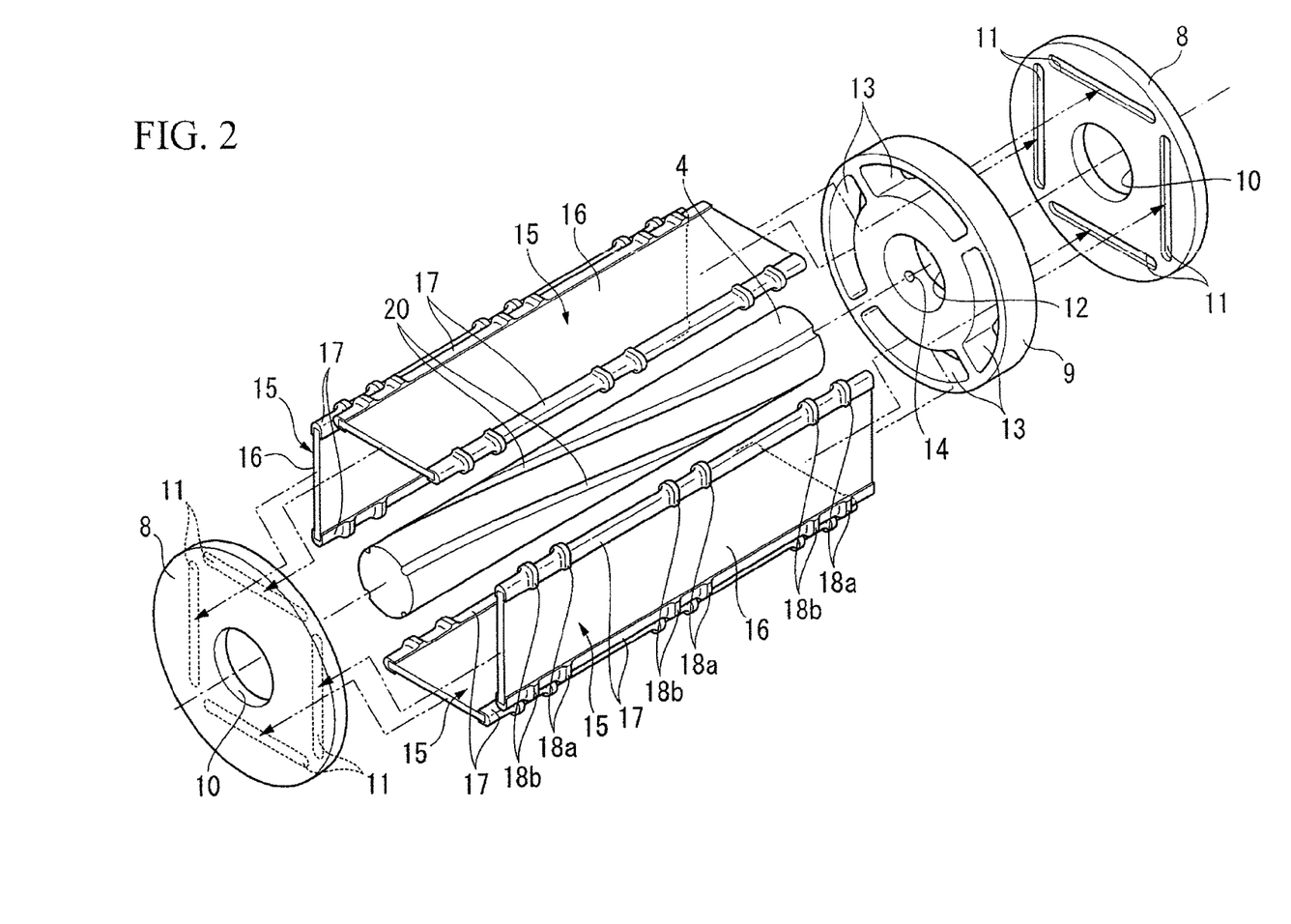
FIG. 2 is an exploded perspective view showing a part of the same door hinge having a check function.
Figure 3:
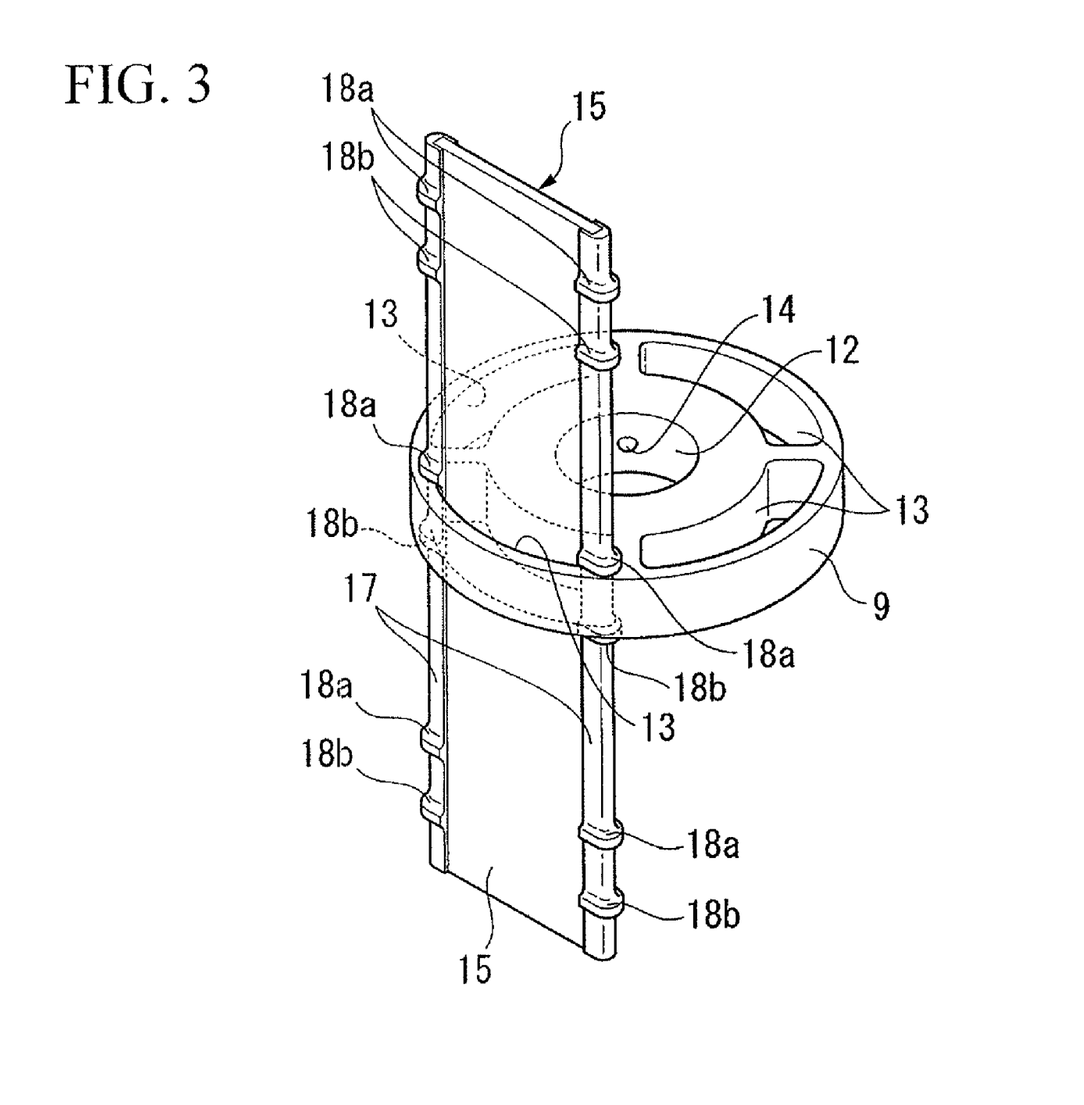
FIG. 3 is another exploded perspective view showing a part of the same door hinge having a check function.

FIG. 1 is a longitudinal sectional view showing a schematic half section in the axial direction of a door hinge 1 having a check function (hereunder, referred to as door hinge 1) according to the present embodiment. FIG. 2 and FIG. 3 are exploded perspective views showing a part of internal components of the door hinge 1.

In FIG. 1, reference symbol 2 denotes a vehicle body-side hinge arm (vehicle body-side hinge member) to be fitted to a door opening section of a vehicle (not shown in the drawing), and reference symbol 3 denotes a door-side hinge arm (door-side hinge member) to be fitted to a door (not shown in the drawing). These hinge arms 2 and 3, although only shown as one axial end of the door hinge 1 in FIG. 1, are symmetrically provided on both axial end sections of the door hinge 1 in a similar manner.

On the vehicle body-side hinge arm 2 there is supported and fixed a hinge shaft 4, and in the vicinity of both axial end sections of this hinge shaft 4 there is rotatably supported, via a bush 5, the door-side hinge arm 3. Moreover to the door-side hinge arms 3 on both axial sides, there is integrally connected a substantially cylindrical check unit 6 that surrounds the circumference of the hinge shaft 4. The check unit 6 rotates accompanying the rotation of the door-side hinge arm 3 when the door is opened or closed. On the outer circumferential surface of the part of the hinge shaft 4 that passes through this check unit 6, there is formed a sectionally semicircular guide groove 20 that gradually inclines in a spiral manner along the axial direction. A plurality of the guide grooves 20 are formed on the outer circumferential surface of the hinge shaft 4 at equal intervals in the circumferential direction.

The check unit 6 is provided with: a cylindrical case 7; disk shaped end plates 8 that are fixed on both ends of this cylindrical case 7 and that have a hole formed therein through which the hinge shaft 4 is to be inserted; and a substantially disk shaped slider 9 (movable member) that is provided within a space surrounded by these cylindrical case 7 and the end plates 8 so as to be able to be displaced in a direction along the hinge shaft 4.

As shown in FIG. 2, the end plates 8 are such that in the center section there is formed a through hole 10 which the hinge shaft 4 is to be inserted, and on the inner surface side that faces the inner circumference of the cylindrical case 7 there are formed four linear engaging grooves 11. These engaging grooves 11 are arranged along the tangential direction of the circumference of the through hole 10 so as to surround the periphery of the through hole 10 in an approximate square shape.

The slider 9 is such that in the center section thereof, there is formed a through hole 12 which the hinge shaft 4 is to be slidably inserted, and in a peripheral section around this through hole 12, there are formed four arc shaped guide holes 13 being coaxial with the through hole 12.

Figure 4:
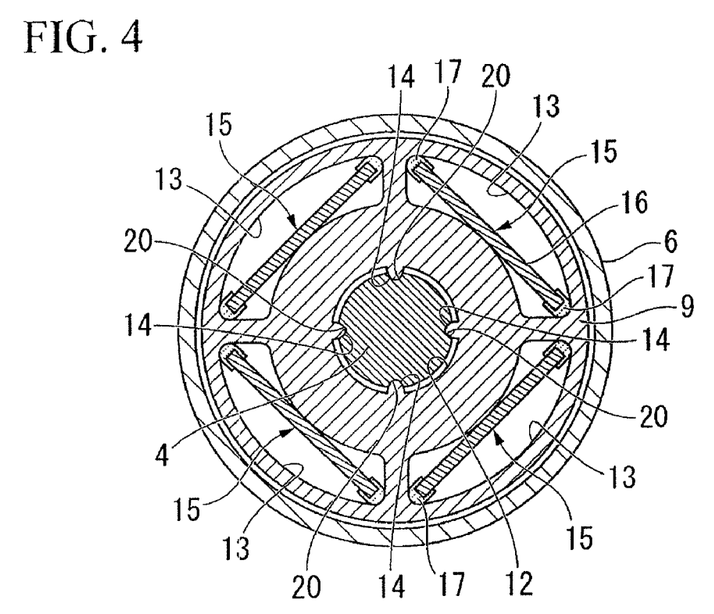
FIG. 4 is a drawing showing the same door hinge having a check function, being a sectional view on A-A of FIG. 1.
Figure 5:
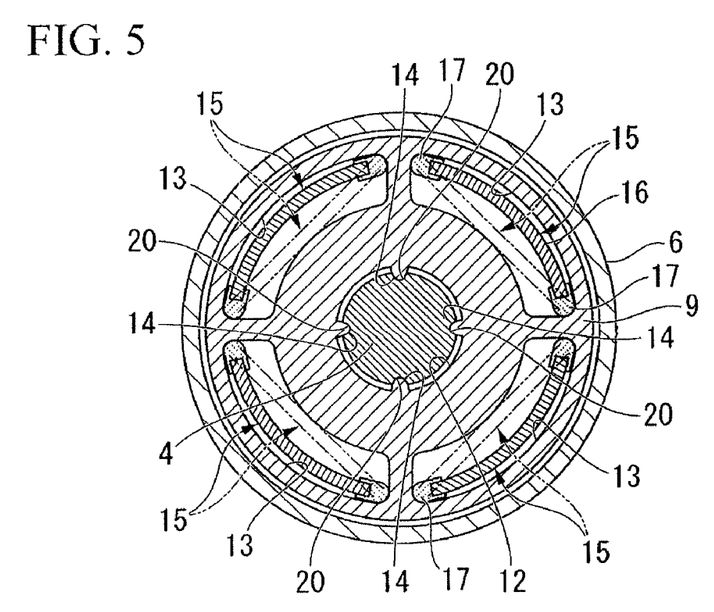
FIG. 5 is a drawing showing the same door hinge having a check function, being a sectional view on A-A of FIG. 1.

FIG. 4 and FIG. 5 are sectional views corresponding to the cross-section A-A of FIG. 1. As shown in these drawings, on the inner circumferential surface of the through hole 12 of the slider 9 there are formed, at equal intervals in the circumferential direction, four hemispherical protrusions 14. These protrusions 14 engage with the corresponding guide grooves 20 on the hinge shaft 4. Consequently, when a relative rotational force is applied to the hinge shaft 4, the protrusions 14 are guided by the guide grooves 20. Therefore the slider 9 rotates while being displaced in the axial direction. In the case of the present embodiment, the protrusions 14 of the slider 9 and the guide grooves 20 of the hinge shaft 4 form an operation conversion device.

A resistance control plate 15 is inserted and engaged in each of the arc shaped guide holes 13 of the slider 9. The resistance control plate 15 is such that on both side edge sections of a rectangular constant width plate spring 16 there is mold-formed a resin material 17. Moreover, on the resistance control plate 15, there are formed, with the resin material 17, a plurality of stopper protrusions 18a . . . and 18b . . . distanced from each other in the lengthwise direction. These stopper protrusions 18a . . . and 18b . . . are similarly formed in corresponding positions on both side edges of the plate spring 16. Furthermore, the stopper protrusions 18a . . . and 18b . . . that are adjacent to each other in the lengthwise direction of the plate spring 16, form pairs (that is to say, a pair is formed by a stopper protrusion 18a and a stopper protrusion 18b), and these pairs of the stopper protrusions 18a and 18b are further arranged along the lengthwise direction of the plate spring 16 so as to be distanced from each other at arbitrary distance. The intervals between the paired stopper protrusions 18a and 18b are set so as to approximately equate to the plate thickness of the slider 9, and the guide holes 13 of the slider 9 can engage between both of the protrusions 18a and 18b.

Both of the lengthwise end sections of the respective resistance control plates 15 are respectively engaged with the opposing engaging grooves 11 of the end plates 8, 8. When a rotational force is transmitted through the door-side hinge arm 3 to the end plates 8, 8, the rotational force is transmitted to the respective resistance control plates 15 . . . as a rotational force about the hinge shaft 4. Furthermore, when the rotational force is transmitted to the respective resistance control plates 15 . . . , the rotational force is transmitted via the guide holes 13 . . . to the slider 9, and a part of the rotational force is converted, by a guiding function of the protrusions 14 and the guide grooves 20, into a thrust force along the axial direction of the slider 9.

When the slider 9 is displaced in the axial direction by the rotation of the end plates 8, 8, the portions of the guide holes 13 of the slider 9 are relatively slide-displaced on the resistance control plates 15. Then when the slider 9 reaches the stopper protrusion 18a or 18b on the resistance control plate 15, the displacement is limited by this stopper protrusion 18a or 18b. At this time, when a large rotational force is applied to the end plates 8, 8, as shown in FIG. 5, the plate spring 16 is bent (elastically deformed) along the widthwise direction, that is, the circumferential direction around the hinge shaft 4. As a result, the stopper protrusion 18a or 18b retracts, and the slider 9 rides over the stopper protrusion 18a or 18b. When the slider 9 has ridden over one of the stopper protrusions 18a and 18b and has been positioned between both of the stopper protrusions 18a and 18b (refer to FIG. 3), the slider 9 receives a retention resistance from both of the stopper protrusions 18a and 18b.

On the surfaces on the opposite sides to the opposing surfaces of both of the stopper protrusions 18a and 18b there are provided gradual inclinations, so that these gradual inclinations guide the slider 9 comparatively smoothly to a retaining position between both of the stopper protrusions 18a and 18b. On the other hand, on the opposing surfaces of both of the stopper protrusions 18a and 18b, there are provided sharp inclinations so that a large retention resistance is applied to the slider 9 at the retaining position between both of the stopper protrusions 18a and 18b.

In the case of the present embodiment, the resistance control plates 15 and the guide holes 13 of the slider 9, constitute a check resistance application device.

As described above, the door hinge 1 converts a relative rotational operation between the vehicle body-side hinge arm 2 and the door-side hinge arm 3 into a slide displacement in the axial direction of the slider 9, by a guiding mechanism formed from the guide grooves 20 of the hinge shaft 4 and the protrusions 14 of the slider 9. Then when the slider 9 reaches the position of the stopper protrusion 18a or 18b on the resistance control plate 15, the slider 9 receives a retention resistance from the stopper protrusion 18a or 18b. Consequently, an operation direction conversion performed by the guiding mechanism significantly amplifies the resistance force of the stopper protrusion 18a or 18b, and thereby it is possible to have a large retention resistance exerted on the door of the vehicle body.

In this door hinge 1, a retention resistance is not directly applied from the radial direction of the hinge shaft 4 to prevent rotation. Therefore it is possible to keep an increase in the outer diameter to a minimum.

Moreover, in the door hinge 1 of the present embodiment, multiple steps of the pairs of stopper protrusions 18a and 18b are provided on the resistance control plate 15 in the lengthwise direction. Therefore angles at which the door opening can be held can be set in multiple steps, and marketability of the vehicle can be increased.

In particular, in this door hinge 1, the resistance control plates 15 with the stopper protrusions 18a and 18b formed thereon, are arranged along the direction of the hinge shaft 4, the length of which can be easily ensured. Therefore it is possible to easily achieve multiple steps of the retaining positions without having to increase the outer diameter.

Moreover, in this door hinge 1, the plate spring 16 that can be deformed within the arc shaped guide hole 13 of the slider 9 allows a retraction displacement of the stopper protrusions 18a and 18b, and a retention resistance is applied mainly by this plate spring 16. Therefore, it is possible to clearly apply and release the retention resistance with sufficient deformation strokes of the plate spring 16. Consequently, it is possible to enhance a detent sensation in a door opening and closing operation, and increase marketability.

In particular, in the case of the present embodiment, as shown in FIG. 4 and FIG. 5, in the initial state where the plate spring 16 is not deformed, a wall on the radial inner side of the arc shaped guide hole 13 comes in contact with one surface of the plate spring 16. Therefore it is possible, with this wall, to limit the bend direction of the plate spring 16, and stabilize the deformation behavior of the plate spring 16, and further stabilize the obtained retention resistance.

Furthermore, in this door hinge 1, the resin material 17 is integrally mold-formed along both of the widthwise edge sections of the constant width plate spring 16, and with this resin material 17, the stopper protrusions 18a and 18b are provided in multiple steps. Therefore it is possible to easily form the resistance control plate 15 that constitutes a part of the check resistance application device. Consequently, by adopting this configuration, a reduction in manufacturing cost can be achieved. Moreover, the portion that slides in the guide hole 13 is formed by the resin material 17. Therefore it is possible, by appropriate selection of the resin material 17, to easily enhance resistance to wear and abrasion at the time of operation.

Furthermore, in this door hinge 1, on both of the edge sections of the constant width plate spring 16, the stopper protrusions 18a and 18b are formed by the resin material 17. Therefore there is an advantage in that changes to be made in specifications such as the number of steps and intervals of the stopper protrusions 18a and 18b can be easily handled.

Moreover, in this door hinge 1, the resistance control plates 15 and the guide holes 13 of the slider 9 that constitute the check resistance application device, are provided symmetrically about the center of the hinge shaft 4. Therefore there is an advantage in that retention resistance is always balanced around the hinge shaft 4, and stable operation is obtained.

Figure 6:
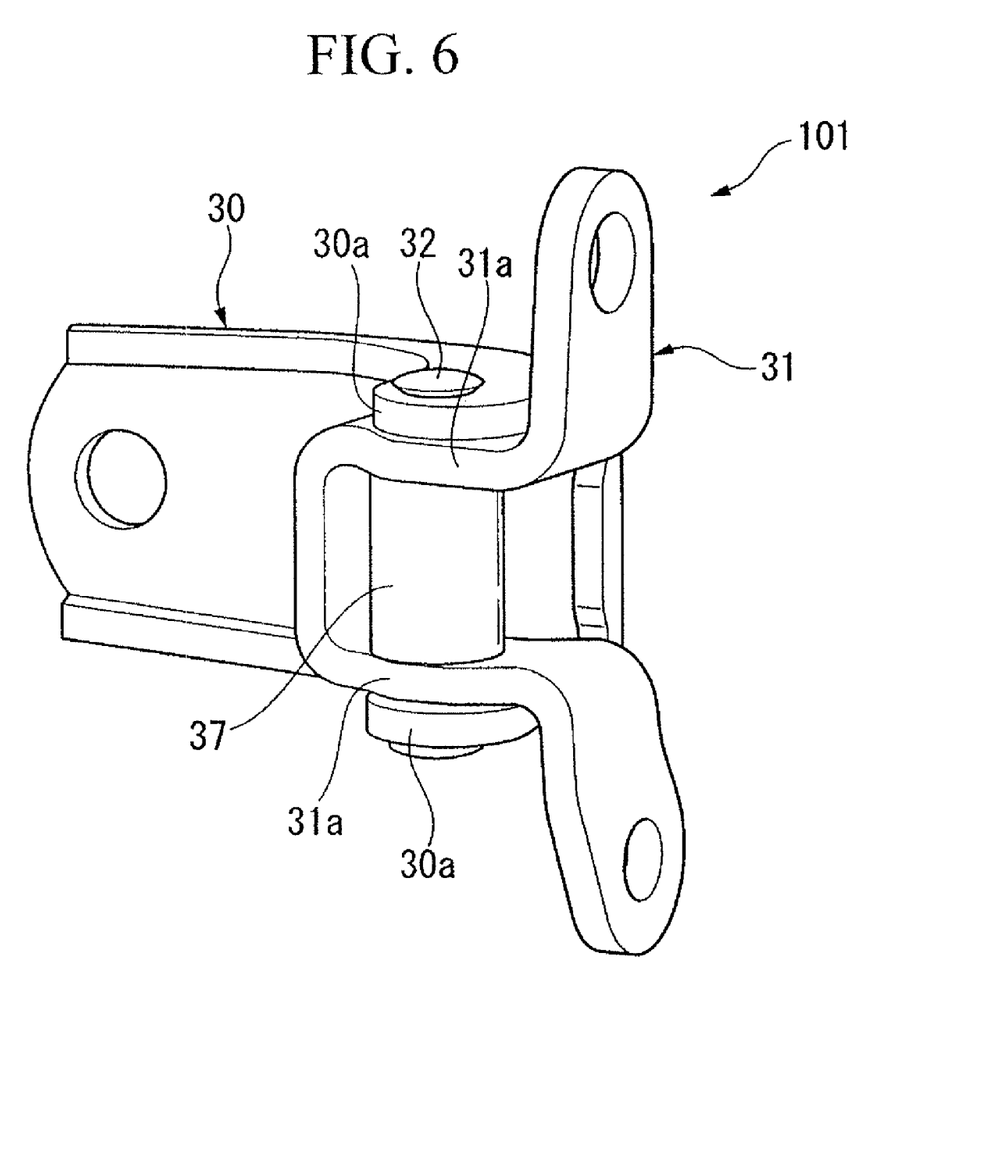
FIG. 6 is a drawing showing a second embodiment of the present invention, being an exploded perspective view of a door hinge having a check function.
Figure 7:
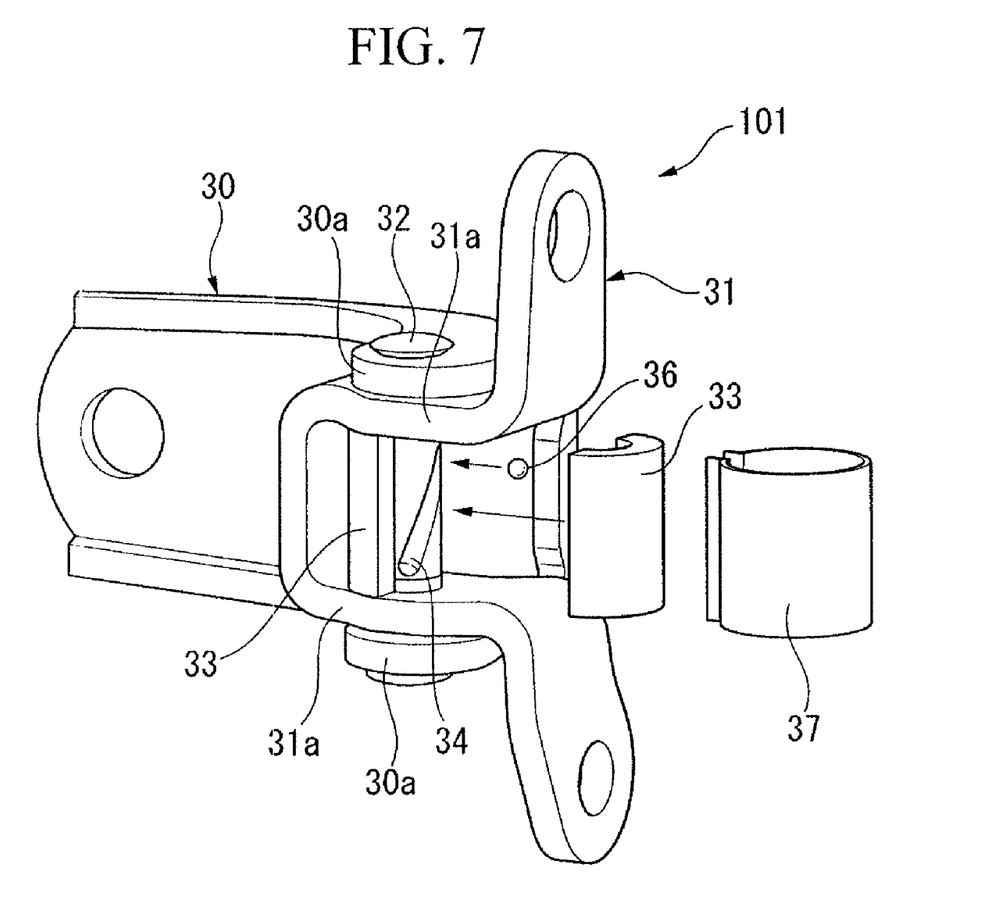
FIG. 7 is an exploded perspective view showing the same door hinge having a check function.
Figure 8:
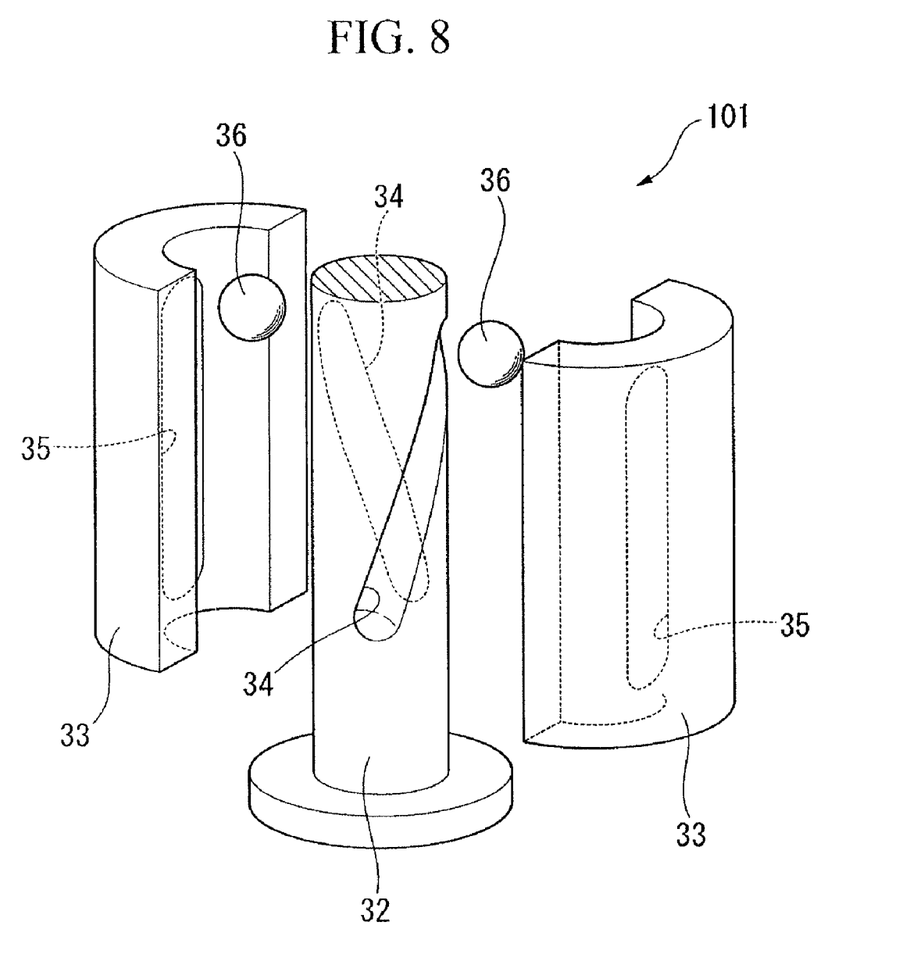
FIG. 8 is an exploded perspective view showing the same door hinge having a check function.

A second embodiment of the present invention is described hereunder, with reference to FIG. 6 to FIG. 8.

FIG. 6 is a perspective view showing the entirety of a door hinge 101 having a check junction of the present embodiment (hereunder, referred to as door hinge 101), and FIG. 7 and FIG. 8 are exploded perspective views of the same door hinge 101. In these drawings, reference symbol 30 denotes a vehicle body-side hinge member, and reference symbol 31 denotes a door-side hinge member.

The vehicle body-side hinge member 30 and the door-side hinge member 31 are respectively provided with a pair of hinge arms 30a, 30a and a pair of hinge arms 31a, 31a (hereunder, respectively referred to as "vehicle body-side hinge arm 30a" and "door-side hinge arm 31a") that are parallel to each other. The door-side hinge arms 31a, 31a are arranged on the inner side of the vehicle body-side hinge arms 30a, 30a. As shown in FIG. 7, a hinge shaft 32 that passes through the door-side hinge arms 31a, 31a is fixed to the vehicle body-side hinge arms 30a. The door-side hinge arms 31a, 31a are rotatably supported on the hinge shaft 32 via a bush or the like (not shown in the drawing).

On the outer circumference of the hinge shaft 32, there is installed a pair of half-cylinder shaped sleeve pieces 33, both of the ends of which engage with the door-side hinge arms 31 a and rotate together with the door-side hinge arms 31a. As shown in FIG. 8, on the outer circumferential surface of the hinge shaft 32, there are formed a pair of sectionally semicircular helical guide grooves 34. These helical guide grooves 34 are gradually inclined in the same direction with respect to the central axis of the hinge shaft 32, and are formed symmetrically about the central axis of the hinge shaft 32. On the other hand, on the inner surface of each sleeve piece 33 opposing the outer circumferential surface of this hinge shaft 32, a sectionally semicircular linear guide groove 35 is formed along the axial direction of the hinge shaft 32. The helical guide grooves 34 on the hinge shaft 32 side and the linear guide grooves 35 on the sleeve piece 33 side respectively correspond to each other on a one-on-one basis, and between the corresponding guide grooves 34 and 35, there is rollably fitted a spherical body 36 serving as a movable member. Moreover, on the outer circumference of the pair of sleeve pieces 33, 33 arranged on the outer circumference of the hinge shaft 32, there is adhered a substantially C shaped tie belt 37 (elastic member) comprising a spring steel sheet, and the sleeve pieces 33,33 are pressed by this tie belt 37 in a direction to approach each other. The tie belt 37 has an axial direction length substantially equal to that of the sleeve pieces 33, 33, and applies a uniform pressing force across substantially the entire axial direction area of the sleeve pieces 33, 33. Consequently, in the case of this door hinge 101, due to the elasticity of the tie belt 37, the spherical body 36 is always pressed against the corresponding helical guide groove 34 and the inner surface of the linear guide groove 35.

In this door hinge 101, the hinge shaft 32 that is integrated with the vehicle body-side hinge member 30 as described above, and the pair of sleeve pieces 33 that are integrated to the door-side hinge member 31, engage with each other via the spherical bodies 36 in the helical guide grooves 34 and the linear guide grooves 35. Therefore, when a relative rotational force is applied between the door-side hinge member 31 and the vehicle body-side hinge member 30, the spherical bodies 36 rotate integrally with the linear guide grooves 35 and roll along the helical guide grooves 34. As a result, a relative rotational operation between both of the hinge members 30 and 31 is converted into a displacement of the spherical bodies 36 substantially along the axial direction. In the case of the present embodiment, the linear guide grooves 35 and the helical guide grooves 34 constitute an operation conversion device.

Moreover, in the case of the present embodiment, a contact resistance between the spherical body 36 and both of the guide grooves 34 and 35, becomes a retention resistance against the operational force, and both of the guide grooves 34 and 35 form a resistance application section of the check resistance application device. In the present embodiment, the check resistance application device is constituted by both of the guide grooves 34 and 35, and the tie belt 37. The pressing force of the tie belt 37 exerts an influence primarily on the operation initial load of the door hinge 101, and the inclination angle of the helical guide groove 34 with respect to the axis of the hinge shaft 32 exerts an influence primarily on the operating load while the door hinge 101 is being operated.

In this door hinge 101, the structure is such that a relative rotational displacement between the door-side hinge member 31 and the vehicle body-side hinge member 30 is converted, via the helical guide grooves 34 and the linear guide grooves 35, into a displacement of the spherical body 36 substantially along the axial direction, while both of the guide grooves 34 and 35 impart a retention resistance to the spherical body 36. Consequently, a sufficiently large retention resistance can be obtained without having to increase the outer diameter.

Moreover, in this door hinge 101, the helical guide grooves 34 and the linear guide grooves 35 form the resistance application section, and a retention resistance is received over the entire movement path of the spherical body 36. Therefore it is possible to increase the level of convenience in operating the door to open or close, and to enhance the marketability of the door opening/closing section. Furthermore in the case of this door hinge 101, the helical guide grooves 34 and the linear guide grooves 35 are always pressed against the spherical body 36 by the elastic force of the tie belt 37. Therefore it is possible to always obtain stable retention resistance. In particular, in the present embodiment, the axial direction length of the tie belt 37 is formed substantially equal to the axial direction length of the sleeve piece 33, and the pressing force of the tie belt 37 always uniformly acts on the entire area of both of the guide grooves 34 and 35. Therefore, a stable retention resistance can be obtained at any door opening degree.

Furthermore, in this door hinge 101, the helical guide grooves 34 and the linear guide grooves 35 that constitute the check resistance application device are respectively provided symmetrically about the center of the hinge shaft 32. Therefore the retention resistance is always balanced around the hinge shaft 32. Consequently it is possible to always obtain stable operations.

Moreover, in this door hinge 101, retention resistance is determined by the inclination angle of the helical guide grooves 34 and the setting of the spring force of the tie belt 37. Therefore there is an advantage in that it is possible, by changing these inclination angle and retention resistance, to comparatively easily manufacture products with different retention resistances.

A third embodiment of the present invention is described hereunder, with reference to FIG. 9 to FIG. 12.

Figure 9:
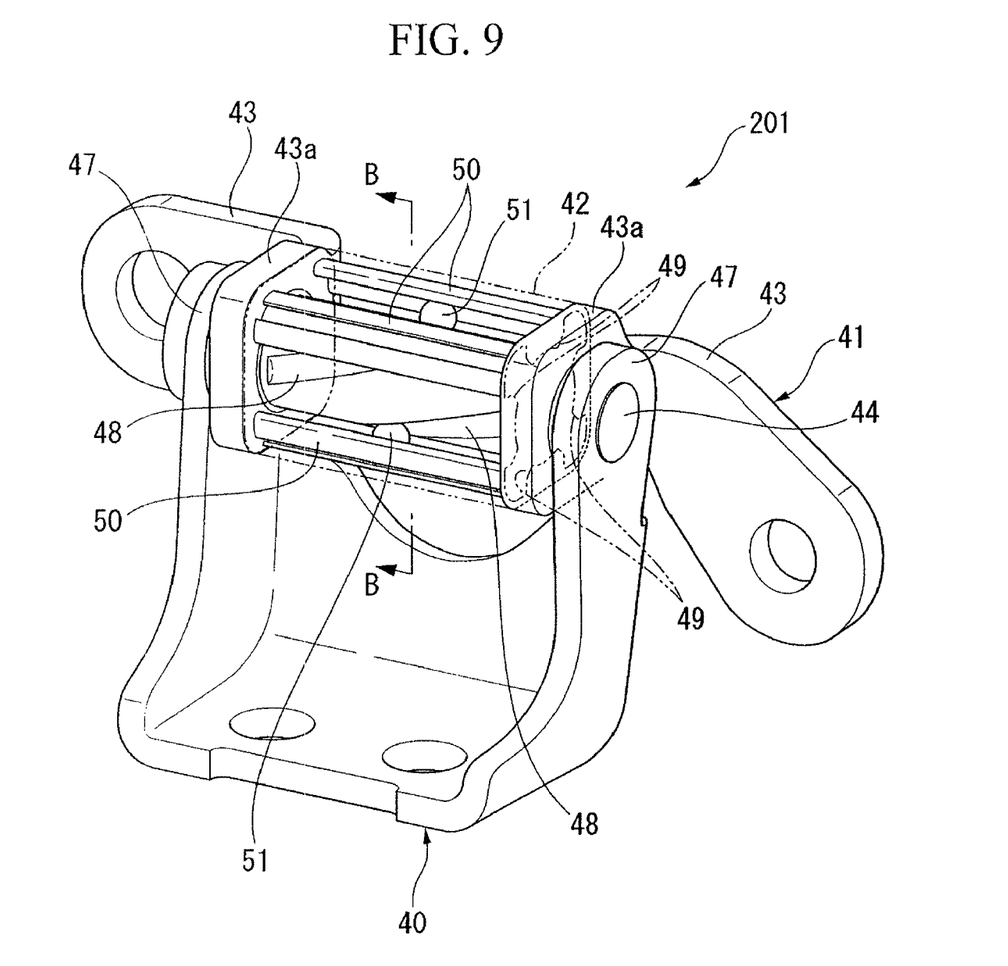
FIG. 9 is a drawing showing a third embodiment of the present invention, being a perspective view of a door hinge having a check function.
Figure 10:
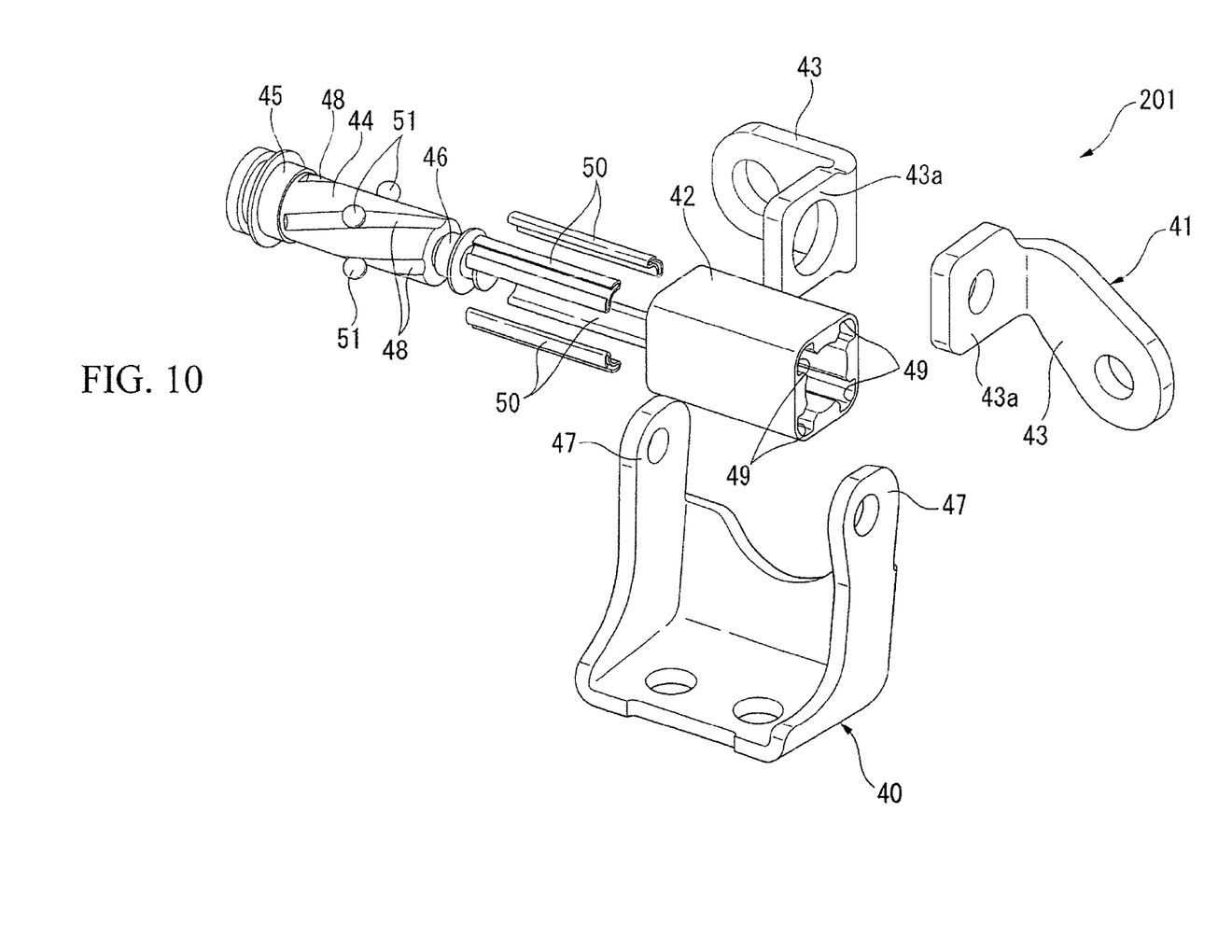
FIG. 10 is an exploded perspective view showing the same door hinge having a check function.
Figure 11:
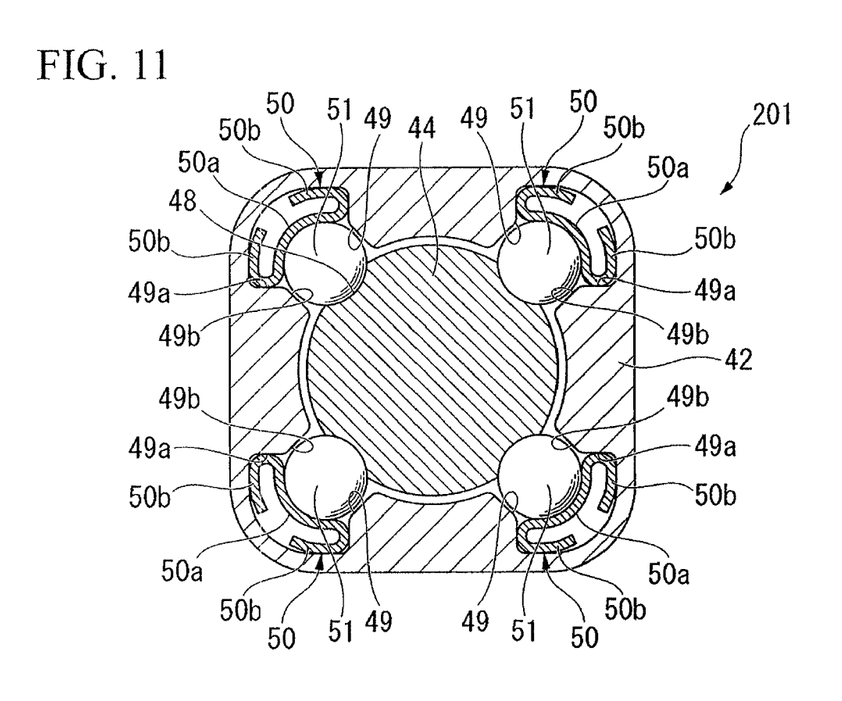
FIG. 11 is a drawing showing the same door hinge having a check function, being a sectional view on B-B of FIG. 9.

FIG. 9 is a perspective view showing the entirety of a door hinge 201 having a check junction according to the present embodiment (hereunder, referred to as door hinge 201), and FIG. 10 is an exploded perspective view of the same door hinge 201.

In these drawings, reference symbol 40 denotes a vehicle body-side hinge member, and reference symbol 41 denotes a door-side hinge member. The door-side hinge member 41 is provided with a sectionally square shaped cylindrical case 42, and a pair of L shaped arms 43 joined to both of the end sections of the case 42. The configuration is such that both of the L shaped arms 43 are joined to the door, and the case 42 rotates with the turning of the door. On facing walls 43a, 43a of the L shaped arms 43, 43, a hinge shaft 44 that passes through the case 42 in the axial direction thereof is rotatably supported via bushes 45 and 46. The end sections on both sides of the hinge shaft 44 pass through the respective walls 43a of the L shaped arms 43, and are respectively joined to a pair of hinge arms 47, 47 of the vehicle body-side member 40.

On the outer circumferential surface of the hinge shaft 44, there are formed four sectionally semicircular helical guide grooves 48 . . . . These four helical guide grooves 48 . . . are gradually inclined at a same angle with respect to the axis of the hinge shaft 44, and are formed at equal pitches on the outer circumference of the hinge shaft 44.

The case 42 of the door-side hinge member 41 is such that in the four corners of the inside thereof there are formed retention grooves 49 extending along the lengthwise direction. As shown in the sectional view of the FIG. 11, these retention grooves 49 are such that the groove width on the bottom section side is formed wider than the groove width on the entry side, and the bottom surface is formed in a gradual arc shape. On the bottom section side of each of the retention grooves 49, there is fitted a spring plate 50 comprising for example, an elastic material such as spring steel material, having a length that ranges from one end to another end in the lengthwise direction of the case 42. As shown in the sectional view of FIG. 11, each of the spring plates 50 is provided with a sectionally substantially arc shaped retention section 50a that continues in the lengthwise direction, and a spring section 50b that is bent, at both edges of the retention section 50a, in a direction opposite to the bend direction of the retention section 50a. The spring sections 50b on both edges are fitted into a widened section 49a on the bottom section side of the corresponding retention groove 49. Each of the spring plates 50 is such that in a state of being attached to the retention groove 49 in this manner, the bent surface of the retention section 50a faces toward the hinge shaft 44 direction, and between the retention section 50a and the helical guide groove 48 of the hinge shaft 44, there is rollably fitted a spherical body 51 serving as a movable member. A reduced width section 49b of each of the retention grooves 49 serves as an accommodating space for the spherical body 51.

Figure 12:
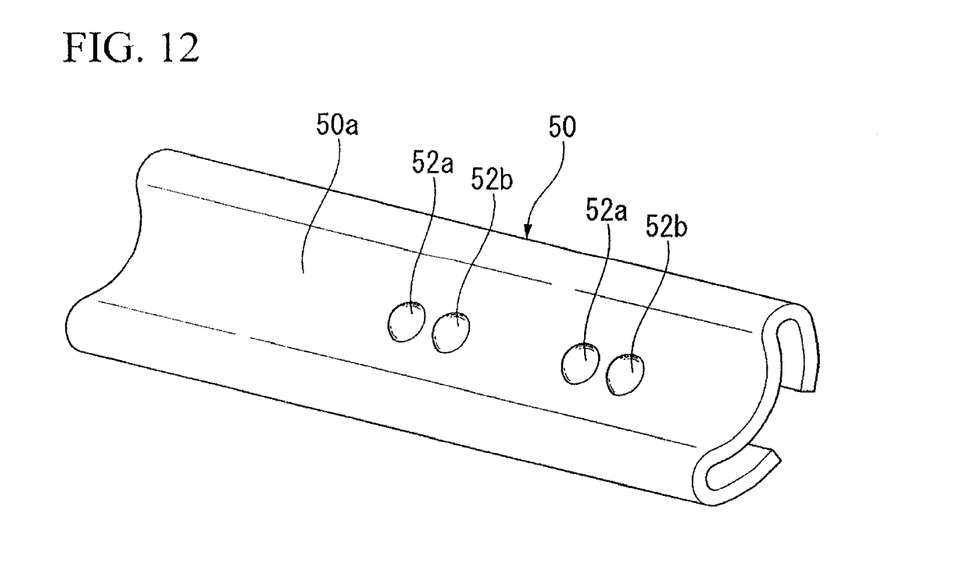
FIG. 12 is a perspective view of a spring plate in the same embodiment.

As shown in the perspective view of FIG. 12, in a predetermined position in the lengthwise direction on the retention section 50a of each of the spring plates 50, there are integrally formed a pair of stopper protrusions 52a and 52b. These pair of stopper protrusions 52a and 52b are formed in two locations on the retention section 50a, and the spherical body 51 is retained between each pair of stopper protrusions 52a and 52b. In the case of the present embodiment, the resistance application section that applies a retention resistance to the spherical body 51, is constituted by the stopper protrusions 52a, 52b. Moreover, the check resistance application device is constituted by the retention grooves 49 in the four corners of the case 42, the retention sections 50a corresponding thereto, and the helical guide grooves 48 of the hinge shaft 44.

In this door hinge 201, the retention grooves 49 are provided in the four corners on the inner side of the substantially square shaped case 42 of the door-side hinge member 41, and the spherical bodies 51 are fitted in between these retention grooves 49, the spring plates 50 of the bottom section of the retention grooves 49, and the corresponding helical guide grooves 48 on the hinge shaft 44. Furthermore the elasticity of the spring plate 50 always acts on the spherical body 51, and thereby the spherical body 51 is always pressed, with a substantially constant force, against the retention section 50a and the helical guide groove 48.

Consequently, when a relative rotational operation is performed between the door-side hinge member 41 and the vehicle body-side hinge member 40, the respective spherical bodies 51 engage with the retention grooves 49 in the four corners of the case 42, and integrally rotate with the door-side hinge member 41, and roll along the helical guide grooves 48 on the hinge shaft 44. At this time, a relative rotational operation between both of the hinge members 41 and 40 is converted into a displacement of the spherical body 51 substantially along the axial direction. Then when each of the spherical bodies 51 has been displaced within each of the retention grooves 49 to a set position in the axial direction, each of the spherical bodies 51 engages within a space between the stopper protrusions 52a and 52b on each of the spring plates 50 and receives a retention resistance. Then when a further rotational operation force is applied to the door-side hinge member 41, each of the spherical bodies 51 rides over the stopper protrusions 52a and 52b, between which each of the spherical bodies 51 is currently engaged, and again receives a retention resistance in a position where it engages with the next pair of stopper protrusions 52a and 52b.

In the case of the present embodiment, the retention grooves 49 on the case 42 side, the spring plates 50, and the helical guide grooves 48 of the hinge shaft 44 constitute an operation conversion device.

In the door hinge 201, a relative rotational displacement between the door-side hinge member 41 and the vehicle body-side hinge member 40 is converted, via the retention grooves 49 of the case 42 and the helical guide grooves 48 of the hinge shaft 44, into a displacement of the spherical body 51 substantially along the axial direction. Moreover the relative rotational position between both of the hinge members 41 and 40 is retained by the resistance that the spherical body 51 receives from the stopper protrusions 52a and 52b on the spring plate 50. Therefore it is possible to obtain a sufficiently large retention resistance without having to increase the outer diameter.

Moreover, in this door hinge 201, the retention grooves 49 are provided along the axial direction in the case 42 of the door-side hinge member 41 that covers the periphery of the hinge shaft 44, and the spherical bodies 51 are fitted within these retention grooves 49. As a result, there is no need to provide dedicated components for forming the retention grooves 49 or dedicated components for covering the periphery of the hinge shaft 44, and the number of components can be reduced by that amount. Consequently it is possible to achieve a reduction in manufacturing cost. Moreover, in this door hinge 201, the case 42 that covers the periphery of the hinge shaft 44 is integrally provided on the door-side hinge member 41. Therefore there is an advantage in that it is possible to simplify a sealing structure for preventing entry of foreign objects such as dust and water into the engagement section of the spherical body 51.

Furthermore, in the case of this door hinge 201, the retention grooves 49 that constitute the check resistance application device are provided in the inner corners of the case 42. Therefore it is possible, in a position sufficiently distanced from the center of the hinge shaft 44, to impart a retention resistance to the spherical body 51. Consequently it is possible to efficiently obtain a large retention resistance without having to increase the size of the entire door hinge 201.

Furthermore, in this door hinge 201, each of the retention grooves 49 on the case 42 side and the helical guide grooves 48 on the hinge shaft 44 side that constitute the check resistance application device, are provided symmetrically about the center of the hinge shaft 44. Therefore the retention resistance is balanced around the hinge shaft 44, and stable operation can be always obtained.

The present invention is not limited to the embodiments described above, and various design changes may be made thereto without departing from the scope and spirit of the invention.

INDUSTRIAL APPLICABILITY

According to the present invention, it is possible to provide a door hinge for a vehicle, having a check function, capable of obtaining a large retention resistance without having to significantly increase the outer diameter dimension.

The invention claimed is:

1. A door hinge for a vehicle, having a check function comprising:
a vehicle body-side hinge member to be fixed to a vehicle body;
a door-side hinge member to be fixed to a door;
a hinge shaft that relatively rotatably connects between the vehicle body-side hinge member and the door-side hinge member;
a movable member capable of being displaced in a axial direction substantially along the hinge shaft;
an operation conversion device that converts a relative rotational movement between the vehicle body-side hinge member and the door-side hinge member into the movable member substantially along the axial direction; and
a check resistance application device that applies a retention resistance against the operational force applied to the movable member by the operation conversion device and thereby serves to resist displacement of the movable member along the axial direction, wherein
the movable member is capable of moving over an axial movement path along the axial direction, and a resistance application section of the check resistance application device is provided in a plurality of locations over said axial movement path,
the operation conversion device includes a guide portion that is formed on the outer circumferential surface of the hinge shaft and gradually inclines in a spiral manner along the axial direction of the hinge shaft, and
the movable member is displaced in the axial direction of the hinge shaft by being guided by the guide portion.

2. The door hinge for a vehicle, having a check function according to claim 1, wherein the check resistance application device includes an elastic member that elastically deforms in a circumferential direction around the hinge shaft, corresponding to the axial direction displacement of the movable member.

3. The door hinge for a vehicle, having a check function according to claim 2, wherein the elastic member extends along an axial direction of the hinge shaft; and the check resistance application device is provided with the elastic member and a stopper protrusion provided integrally with the elastic member.

4. The door hinge for a vehicle, having a check function according to claim 3, wherein the check resistance application device is provided symmetrically about a center of the hinge shaft.

5. The door hinge for a vehicle, having a check function according to claim 2, wherein the check resistance application device is provided symmetrically about a center of the hinge shaft.

6. The door hinge for a vehicle, having a check function according to claim 1, wherein the check resistance application device includes an elastic member that always exerts a biasing force in a pressing direction, on the resistance application section.

7. The door hinge for a vehicle, having a check function according to claim 6, wherein the elastic member is provided over an entire axial movement path of the movable member.

8. The door hinge for a vehicle, having a check function according to claim 6, wherein the check resistance application device is provided symmetrically about a center of the hinge shaft.

9. The door hinge for a vehicle, having a check function according to claim 1, wherein the check resistance application device is provided symmetrically about a center of the hinge shaft.

10. The door hinge for a vehicle, having a check function according to claim 1, wherein the check resistance application device is provided in a case that covers an entire axial movement path of the movable member.

11. The door hinge for a vehicle, having a check function according to claim 10, wherein
the case is sectionally formed in a square shape; and
the check resistance application device is provided in a corner section of the case.

12. The door hinge for a vehicle, having a check function according to claim 1, wherein
a plurality of the guide portions are provided on the outer circumferential surface of the hinge shaft at equal intervals in the circumferential direction.

13. A door hinge for a vehicle, having a check function comprising:
a vehicle body-side hinge member to be fixed to a vehicle body;
a door-side hinge member to be fixed to a door;
a hinge shaft that relatively rotatably connects between the vehicle body-side hinge member and the door-side hinge member;
a movable member capable of being displaced in an axial direction substantially along the hinge shaft;
an operation conversion device that converts a relative rotational movement between the vehicle body-side hinge member and the door-side hinge member into an operational force that is applied to the movable member and serves to displace the movable member substantially along the axial direction; and
a check resistance application device that applies a retention resistance against the operational force applied to the movable member by the operation conversion device and thereby serves to resist displacement of the movable member along the axial direction, wherein
the check resistance application device includes an elastic member that elastically deforms in a circumferential direction around the hinge shaft, corresponding to the axial direction displacement of the movable member;
the elastic member extends along the axial direction of the hinge shaft; and
the check resistance application device is provided with the elastic member and a stopper protrusion provided integrally with the elastic member.

14. A door hinge for a vehicle, having a check function comprising:
a vehicle body-side hinge member to be fixed to a vehicle body;
a door-side hinge member to be fixed to a door;
a hinge shaft that relatively rotatably connects between the vehicle body-side hinge member and the door-side hinge member;
a movable member capable of being displaced in an axial direction substantially along the hinge shaft;
an operation conversion device that converts a relative rotational movement between the vehicle body-side hinge member and the door-side hinge member into an operational force that is applied to the movable member and serves to displace the movable member substantially along the axial direction; and
a check resistance application device that applies a retention resistance against the operational force applied to the movable member by the operation conversion device and thereby serves to resist displacement of the movable member along the axial direction, wherein the check resistance application device is provided in a case that covers an entire axial movement path of the movable member;

the case is sectionally formed in a square shape; and the check resistance application device is provided in a corner section of the case.

* * * * *